(12) United States Patent
Mahaffey

(10) Patent No.: US 10,935,200 B1
(45) Date of Patent: Mar. 2, 2021

(54) GOBO RETAINER

(71) Applicant: Electronic Theatre Controls, Inc., Middleton, WI (US)

(72) Inventor: Russell Mahaffey, Highland Village, TX (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 16/750,451

(22) Filed: Jan. 23, 2020

(51) Int. Cl.
| | |
|---|---|
| *F21V 17/02* | (2006.01) |
| *F21V 17/16* | (2006.01) |
| *F21S 10/00* | (2006.01) |
| *G02B 6/35* | (2006.01) |
| *F21W 131/406* | (2006.01) |

(52) U.S. Cl.
CPC .......... *F21S 10/007* (2013.01); *G02B 6/3512* (2013.01); *F21W 2131/406* (2013.01)

(58) Field of Classification Search
CPC ................ F21S 10/007; G02B 6/3512; F21W 2131/406
See application file for complete search history.

(56) References Cited

U.S. PATENT DOCUMENTS

| | | | |
|---|---|---|---|
| 5,402,326 A | 3/1995 | Belliveau | |
| 5,791,755 A | 8/1998 | Henry et al. | |
| 8,459,847 B2 | 6/2013 | Salm | |
| 8,752,985 B2 | 6/2014 | Quadri | |
| 2009/0323355 A1* | 12/2009 | Mahaffey | F21S 10/007 362/323 |
| 2010/0208475 A1* | 8/2010 | Sherman | F21S 10/007 362/418 |
| 2010/0246182 A1* | 9/2010 | Jurik | F21S 10/007 362/277 |
| 2019/0346100 A1* | 11/2019 | Kildeby | F21V 13/00 |

* cited by examiner

*Primary Examiner* — Tracie Y Green
(74) *Attorney, Agent, or Firm* — Michael Best and Friedrich LLP

(57) ABSTRACT

A gobo system for a light fixture. The rotating gobo system including a gobo, a gobo retainer, and a gobo carrier. The gobo retainer is coupled to the gobo and includes a tab. The gobo carrier is coupled to the light fixture. The gobo carrier includes a seat for supporting the gobo and a recess for receiving the tab of the gobo retainer. The gobo retainer is rotatable relative to the gobo carrier between a locked position and an unlocked position.

20 Claims, 13 Drawing Sheets

GOBO RETAINER

BACKGROUND

The present invention relates to means for securing a gobo onto a gobo wheel.

Automated and remotely controllable luminaires are generally known in the entertainment and architectural lighting markets. A gobo can be used with these luminaires to project patterns upon a stage or other projection surface. The gobo is typically comprised of a film, cut metal, metal on glass, or etched glass to provide an image to be projected. Gobos are often secured onto a gobo wheel in a planetary type arrangement such that the gobos may rotate around a center axis of the gobo wheel. Any gobo positioned on the gobo wheel may be selected by the automated and remotely controllable luminaire such that the selected gobo interacts with the emitted light of the luminaire. An example of a gobo assembly is described and illustrated in U.S. Pat. No. 5,402,326, the entire contents of which is hereby incorporated by reference.

SUMMARY

In one embodiment, the invention provides a rotating gobo system for a light fixture. The rotating gobo system including a gobo, a gobo retainer, and a gobo carrier. The gobo retainer is coupled to the gobo and includes a tab. The gobo carrier is coupled to the light fixture. The gobo carrier includes a seat for supporting the gobo and a recess for receiving the tab of the gobo retainer. The gobo retainer is rotatable relative to the gobo carrier between a locked position and an unlocked position.

In another embodiment, the invention provides a light fixture including a housing, a light source disposed in the housing, and a rotating gobo system coupled to the housing. The light source is configured to create a light beam. The rotating gobo system includes a gobo, a gobo retainer, and a gobo carrier. The gobo retainer is coupled to the gobo and includes a tab. The gobo carrier is coupled to the light fixture. The gobo carrier includes a seat for supporting the gobo and a recess for receiving the tab of the gobo retainer. The gobo retainer is rotatable relative to the gobo carrier between a locked position and an unlocked position.

In a further embodiment, the invention provides a retainer for coupling a gobo to a gobo carrier. The retainer includes a circular ring and a tab extending from the circular ring, and the tab includes a spring biased portion. Rotation of the tab locks the gobo relative to the gobo carrier.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
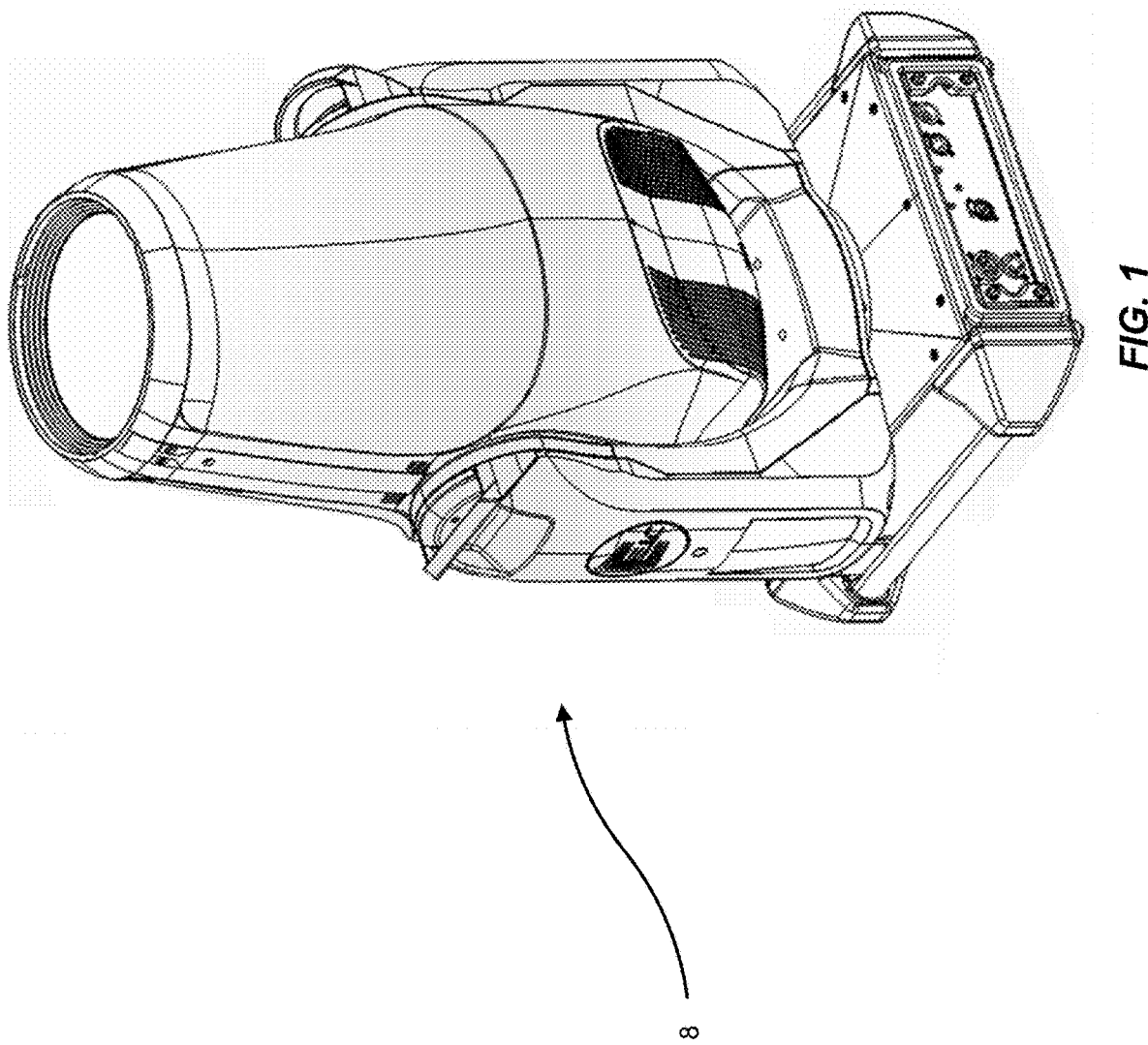
FIG. 1 is a perspective view of a light according to an embodiment of the invention.
Figure 2:
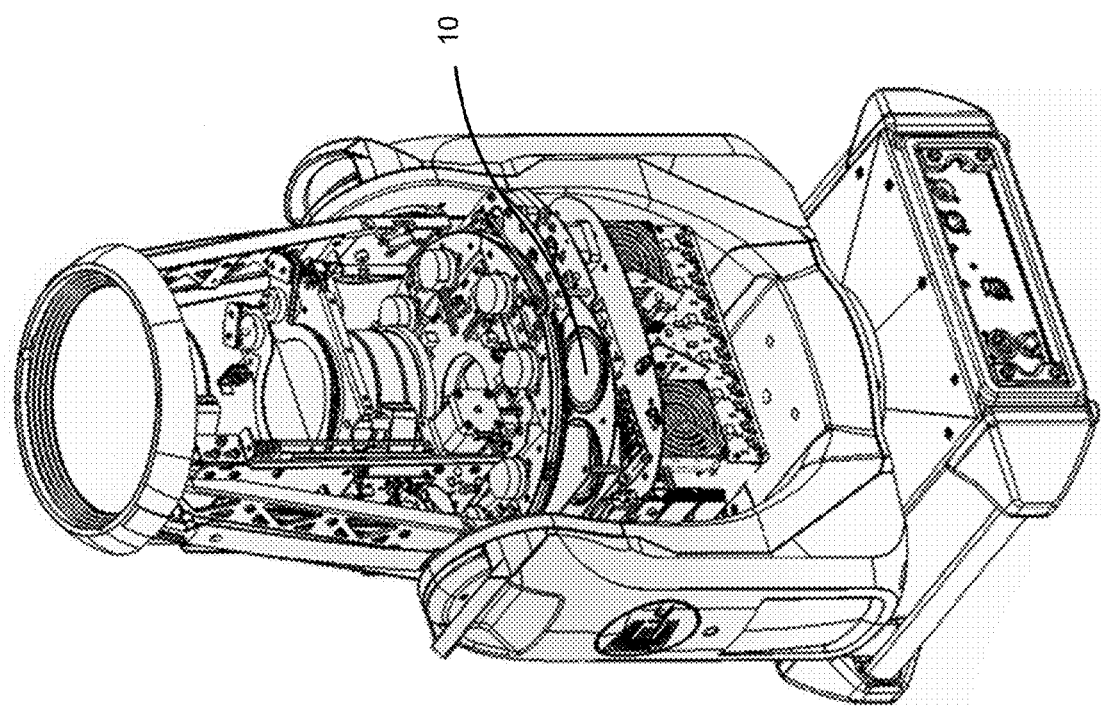
FIG. 2 is a perspective view of the light of FIG. 1 with a portion of a housing removed.
Figure 3:
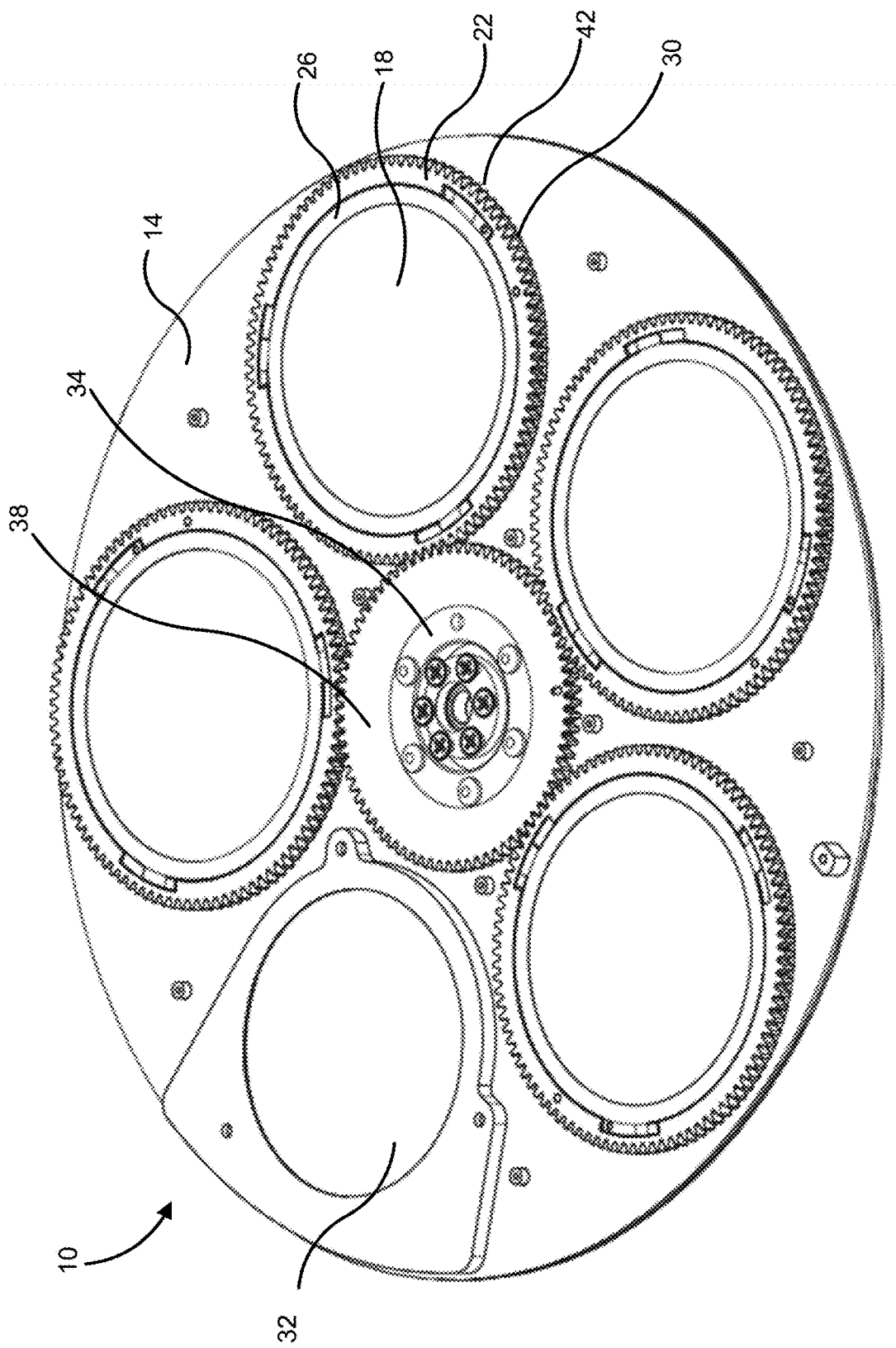
FIG. 3 is a perspective view of a rotating gobo system of the light of FIG. 1.

FIGS. 1-3 illustrates a rotating gobo system 10 having a gobo wheel 14. The gobo wheel 14 is configured to support a plurality of gobos 18. Gobo carriers 22 are disposed in the gobo wheel 14 and engage with gobo retainers 26 to couple the gobos 18 to the gobo wheel 14. The rotating gobo system 10 may be placed inside a housing or in front of a light fixture 8 (FIGS. 1 and 2) to control the shape of the emitted light. For example, a lighting designer may use the rotating gobo system 10 to manipulate a shape of the emitted light such that the emitted light creates a pattern over a space or an object. The rotating gobo system 10 is particularly suited for use during live performances, including theatre productions, concerts, television or movie studio productions, and the like.

The gobo wheel 14 includes a plurality of apertures 30 positioned around a central axis of the gobo wheel 14. The apertures 30 are configured to receive the gobo carriers 22 such that the gobo carriers 22 may rotate. In the depicted embodiments, the gobo wheel 14 includes four apertures 30. In additional embodiments, the gobo wheel 14 may include less than, or more than, four apertures 30. A clear aperture 32 is also provided on the gobo wheel 14 to allow for the passage of unadulterated light. The gobo wheel 14 further includes a central hub 34 positioned on the central axis and extending outwardly from an upper surface of the gobo wheel 14. The central hub 34 provides attachment to a rotatable shaft of a rotation motor (not shown). Rotation of the rotatable shaft causes the gobo wheel 14 to rotate about the central axis.

A central sun gear 38 is positioned on the central axis, proximate the central hub 34. The central sun gear 38 is coupled to a motor (not shown) positioned on the housing in which the gobo wheel 14 is disposed therein. The motor rotates with the gobo wheel 14 such that the central sun gear 38 is able to rotate independently of the rotation of the gobo wheel 14. The sun gear 38 includes teeth that engage a ring gear 42 formed on an outer periphery of each gobo carrier 22. When the gobo carriers 22 are coupled to the gobo wheel 14, rotation of the central sun gear 38 causes each of the gobo carriers 22 to rotate relative to the gobo wheel 14.

Figure 4:
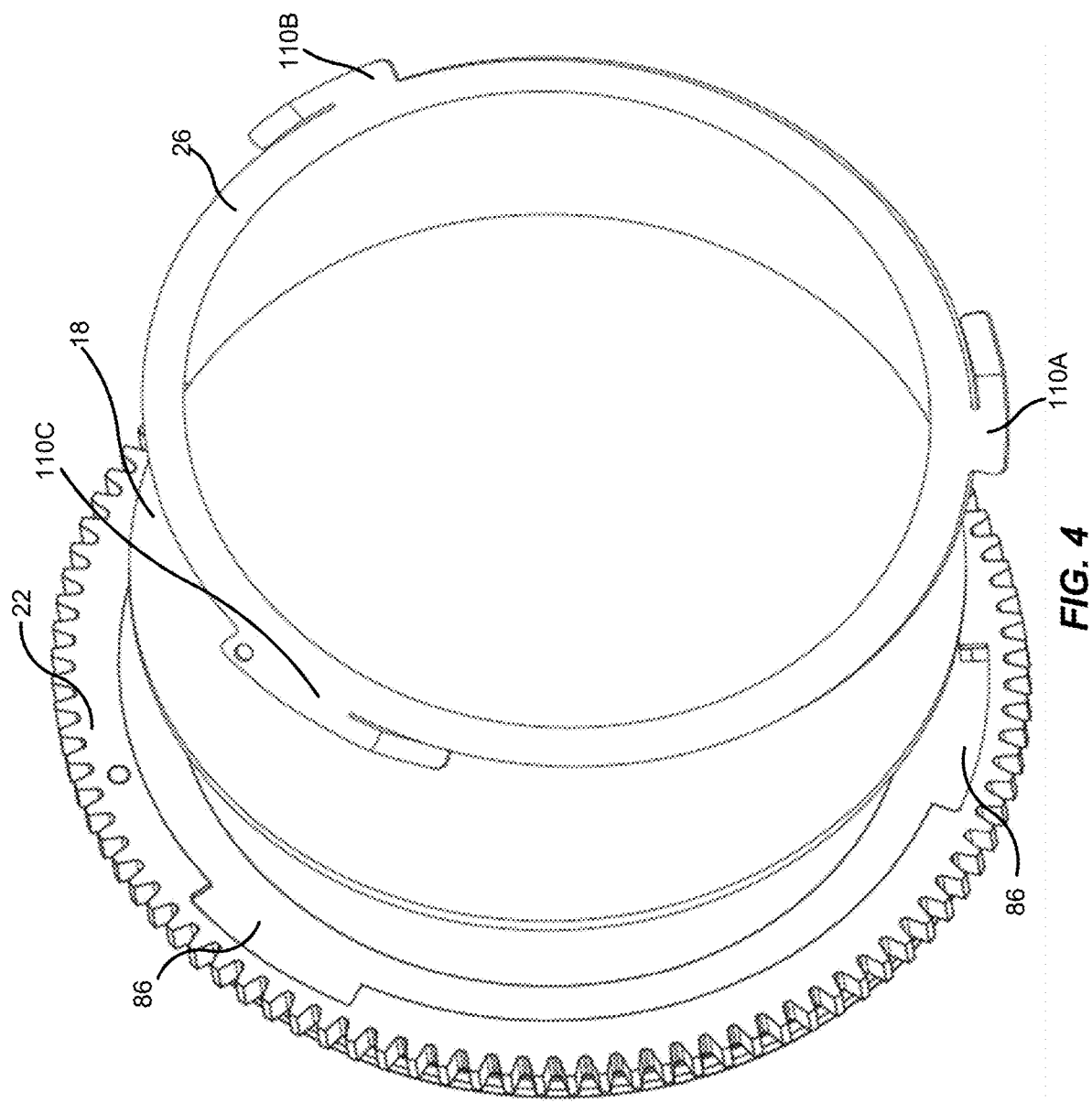
FIG. 4 is an exploded perspective view of a gobo carrier, a gobo, and a gobo retainer of FIG. 3.
Figure 5:
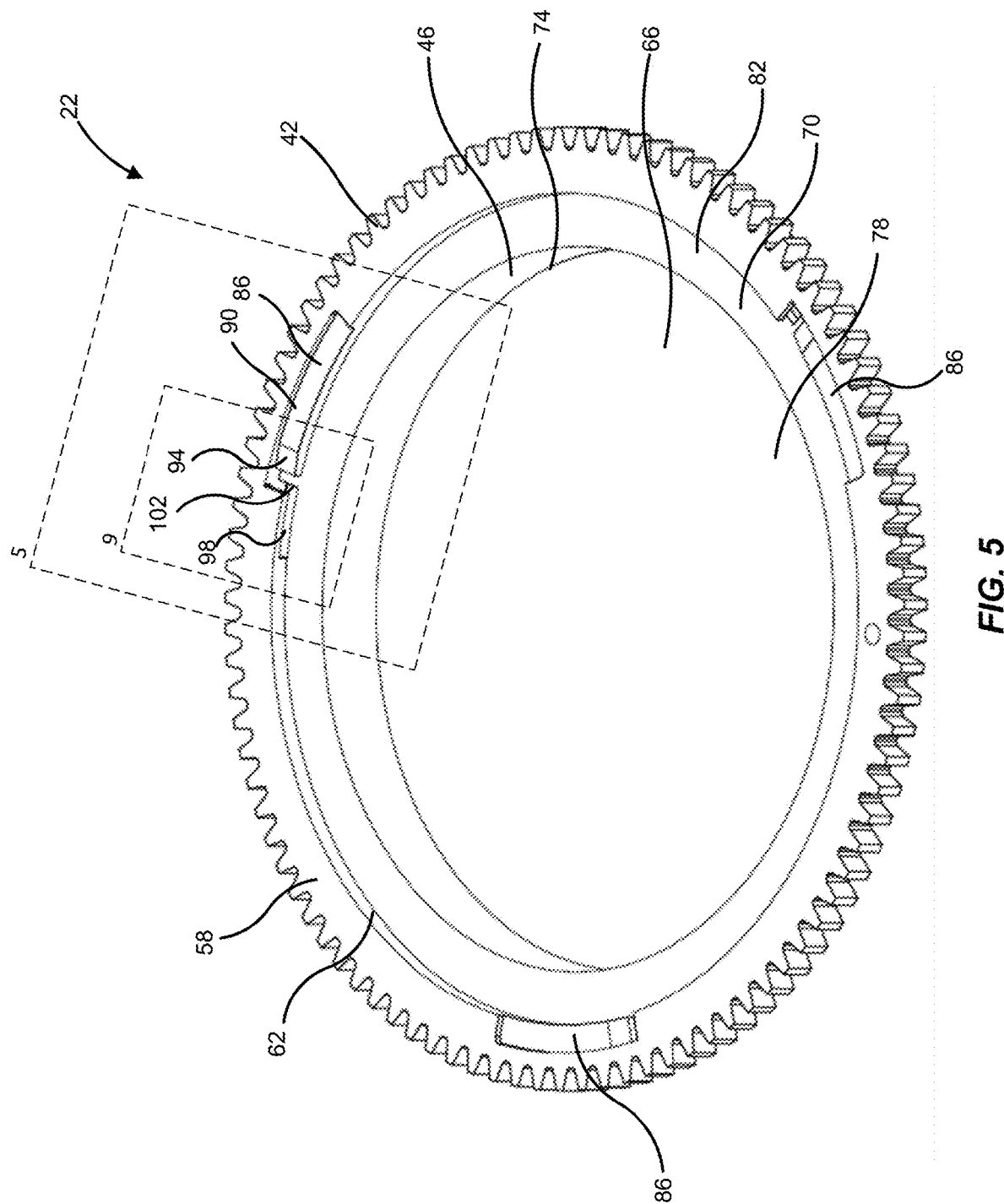
FIG. 5 is a perspective front view of the gobo carrier of FIG. 4.

With reference to FIGS. 4 and 5, the gobo carrier 22 includes the complimentary ring gear 42 and a cylindrical portion 46. Each ring gear 42 includes a front surface 58 and an inner surface 62 defining a hollow center 66 having a first diameter. The front surface 58 defines a first end of the gobo carrier 22.

A front side 70 of the cylindrical portion 46 is coupled to (e.g., integral with) the inner surface 62 of the ring gear 42 such that the cylindrical portion 46 extends rearward from the first end of the gobo carrier 22. The cylindrical portion 46 includes a rear side 74 and defines a hollow center 78. The rear side 74 defines a second end of the gobo carrier 22. The hollow center 78 has a second diameter that is smaller than the first diameter. Due to the second diameter being smaller than the first diameter, the front side 70 forms a ledge or seat 82 that is configured to support the gobo 18 and the gobo retainer 26.

The gobo carrier 22 further includes recessed portions 86 configured to receive a corresponding gobo retainer 26. The recessed portions 86 are formed in the front surface 58 of the ring gear 42. The recessed portions 86 are positioned around, and equally spaced from, a central axis of the gobo carrier 22. In the depicted embodiment, each gobo carrier 22 includes three recessed portions 86. In other embodiments, the gobo carrier 22 may include more than, or less than, three recessed portions 86.

Figure 6:
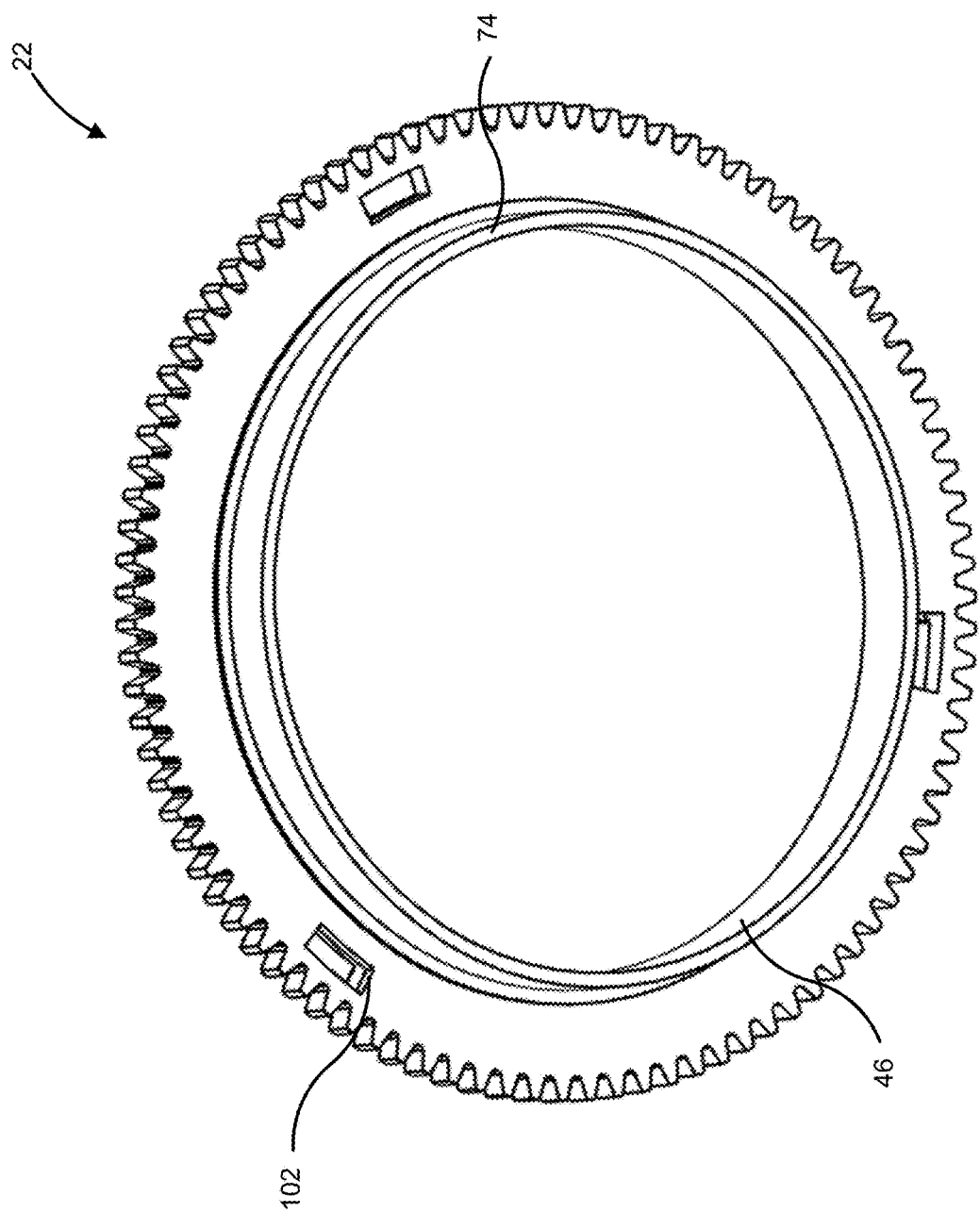
FIG. 6 is a perspective rear view of the gobo carrier of FIG. 4.
Figure 7:
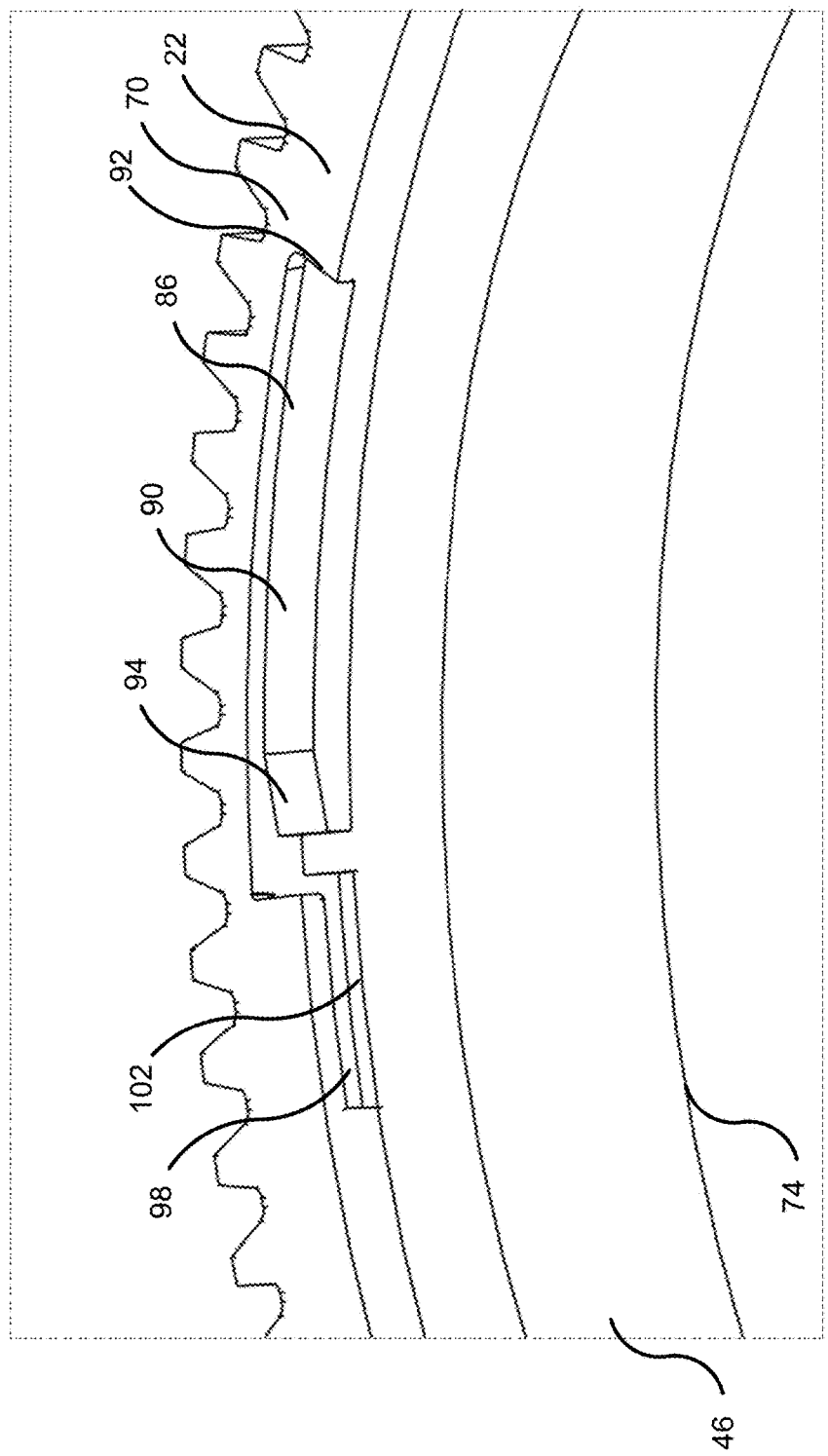
FIG. 7 is an enlarged view of the gobo carrier of FIG. 5 depicting a recessed portion.

With reference to FIG. 7, each recessed portion 86 includes a straight portion 90 integrally coupled to a ramp portion 94. The straight portion 90 is separated from the remainder of the gobo carrier 22 via an edge surface 92. The edge surface 92 recesses the recessed portion 86 such that the recessed portion 86 is non-coplanar with the front surface 58 of the ring gear 42. A thickness of the recessed portion 86 is generally constant along the straight portion. The thickness of the recessed portion 86 gradually increases through the ramp portion 94. The straight portion 90 and the ramp portion 94 are accessible through the first end of the gobo carrier 22. The ramp portion 94 leads to a channel 98 that is covered by the front surface 58 of the ring gear 42. In other words, the channel 98 is not directly accessible through the first end of the gobo carrier 22. A cut out 102 is formed in the channel 98. The cut out 102 extends through a thickness of the ring gear 42, although in additional embodiments the cut out 102 may extend partially through the thickness of the ring gear 42 (FIG. 6). The channel 98 and the cut out 102 extend along a curvature of the ring gear 42. In the depicted embodiment, a length of the channel 98, defined as the circumferential length the channel 98 extends along the ring gear 42, is greater than a length of the cut out 102, defined as the circumferential length the cut out 102 extends along the ring gear 42.

Figure 8:
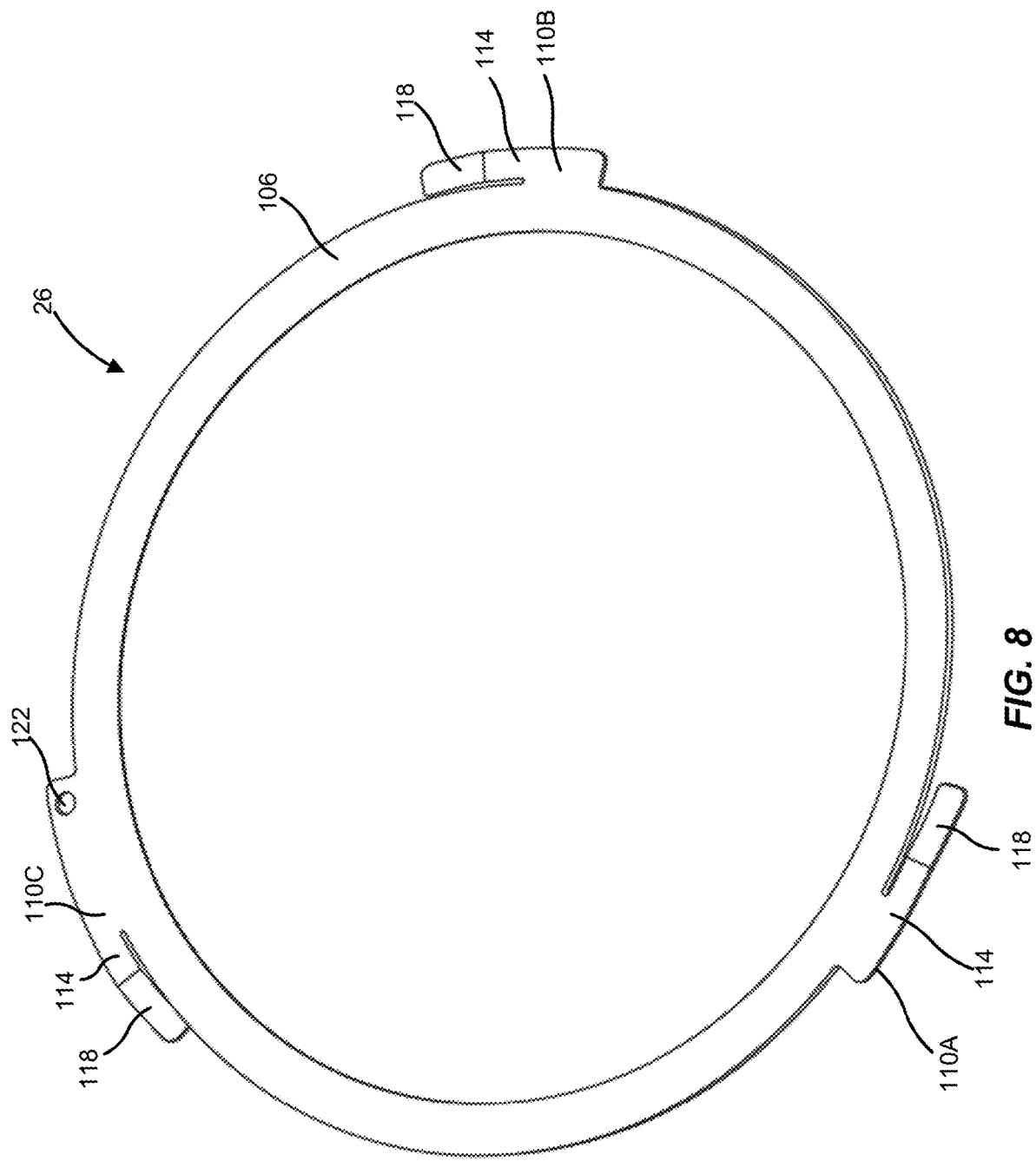
FIG. 8 is a perspective view of the gobo retainer of FIG. 4.

With reference to FIG. 8, the gobo retainer 26 defines a circular ring 106. Tabs 110 are integrally formed with and extend outwardly from the circular ring 106. The spacing of the tabs 110 corresponds to the spacing of the recessed portions 86 of the gobo carrier 22. In the depicted embodiment, a first tab 110A, a second tab 110B, and a third tab 110C are positioned around, and equally spaced from, a central axis of the gobo retainer 26. In other embodiments, the gobo retainer 26 may include more than, or less than three tabs 110.

The first, second, and third tabs 110A-C include a parallel tab 114 and a spring biased tab 118. The parallel tab 114 is generally parallel with the circular ring 106. The spring biased tab 118 is angled relative to the parallel tab 114. The parallel tab 114 and the spring biased tab 118 are formed from an elastic material such that the parallel tab 114 is no longer parallel in response to application of a force and the angle of the spring biased tab 118 will change in response to application of the force. The parallel tab 114 and the spring biased tab 118 are formed such that the parallel tab 114 and the spring biased tab 118 follow a circumferential curvature of the circular ring 106. The first and second tabs 110A,110B each have a length that is substantially the same as the other. The length is defined as the distance that the tabs 110A and B extend along a circumference of the circular ring. The third tab 110C differs in that a length of the third tab 110C, as defined as the distance that the third tab 110C extends along the circumference of the circular ring 106, is greater that the length of the first and second tabs 110A, 110B. Additionally, the third tab 110C includes a hole 122 extending through the parallel tab 114. The hole 122 is positioned proximate one end of the parallel tab 114 opposite the spring biased tab 118.

With renewed reference to FIG. 4, the gobos 18 of the depicted embodiment are discs formed from a metal material with cutouts (not shown in FIG. 4) such that light can pass through the cutouts. In some embodiments, the gobos 18 may be formed from a film, metal on glass material, or an etched glass. In other embodiments, the gobos 18 may be formed from an alternate material. When the emitted light is cast on the gobo 18, the cut outs create a pattern on the object that the emitted light is shining on.

Figure 9:
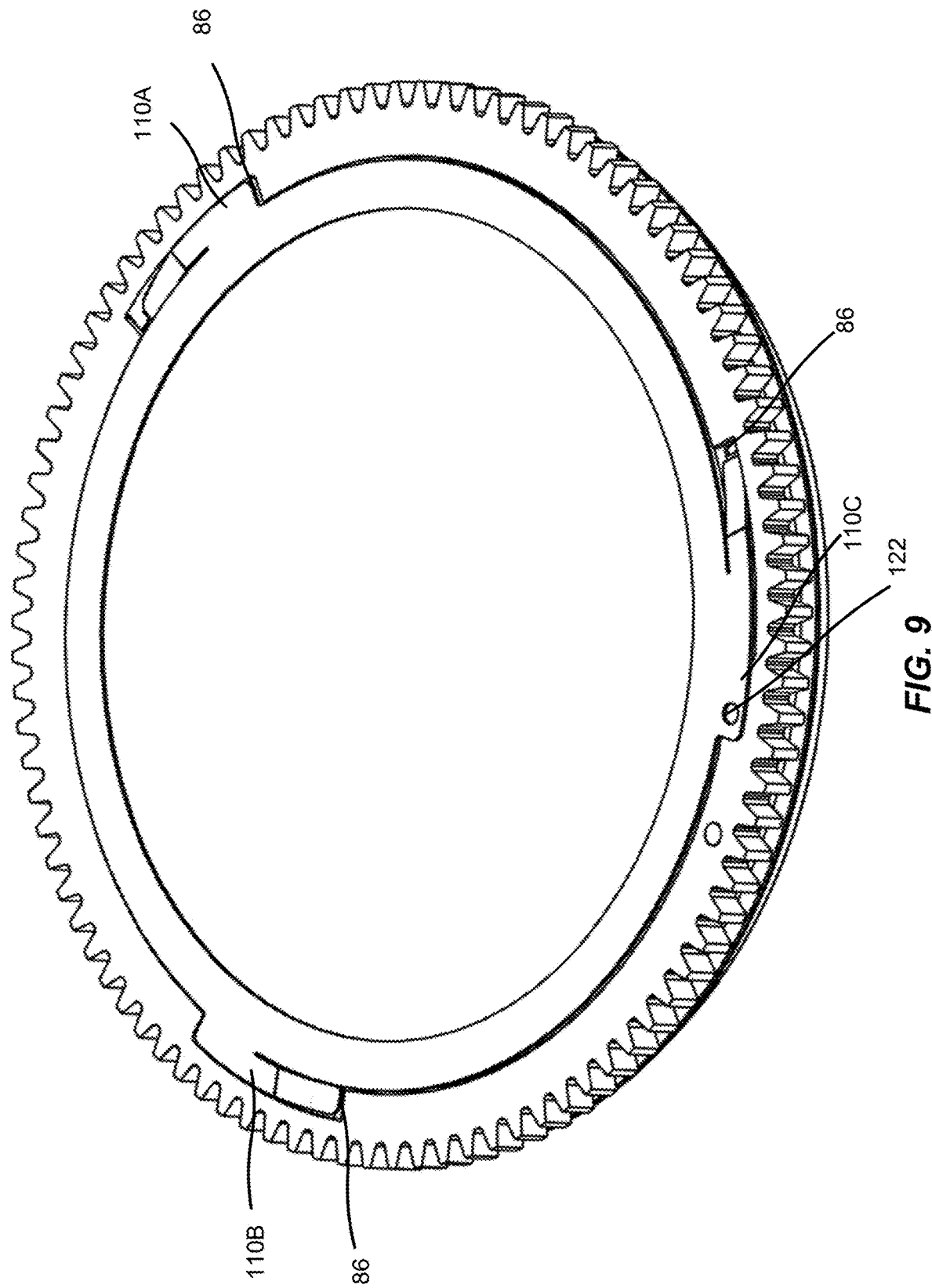
FIG. 9 is a perspective view of the gobo carrier, the gobo, and the gobo retainer of FIG. 4 in an unlocked position.
Figure 10:
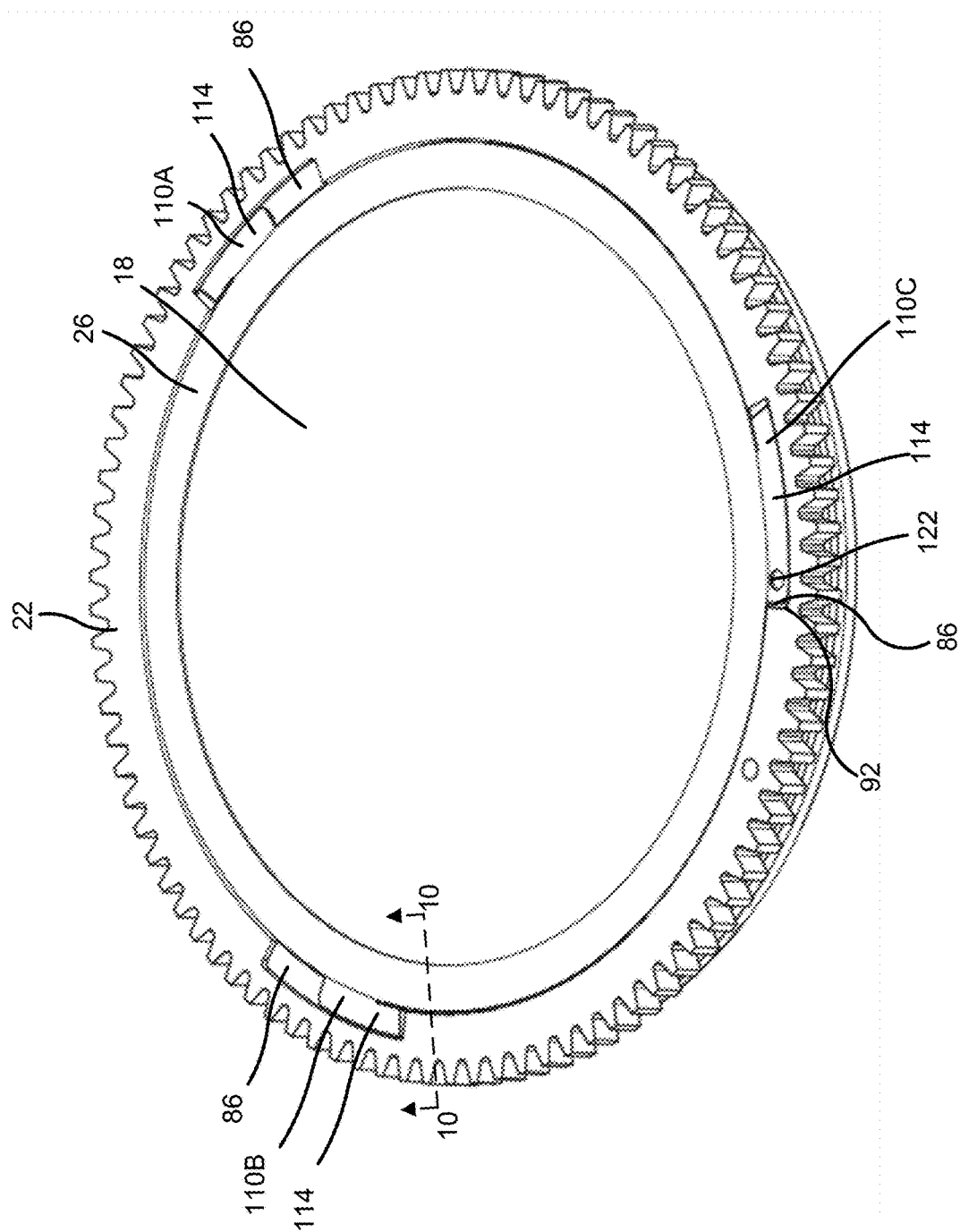
FIG. 10 is a perspective view of the gobo carrier, the gobo, and the gobo retainer of FIG. 4 in a locked position.

With reference to FIGS. 9 and 10 to couple the gobo 18 to the gobo carrier 22, the gobo 18 is disposed on the ledge 82 of the cylindrical portion 46 (shown in FIG. 9). Thereafter, the tabs 110A-C of the gobo retainer 26 are inserted into the recessed portion 86. In this position, the tabs 110A-C are positioned proximate the recessed portions 86, while the circular ring 106 overlays the gobo 18 on the ledge 82. Subsequently, the gobo retainer 26 is rotated in a counterclockwise direction such that the tabs 110A-C slide along the ramp portion 94, and into the channel 98. The spring biased tab 118 of each tab 110A-C interacts with the ring gear 42.

Figure 11:
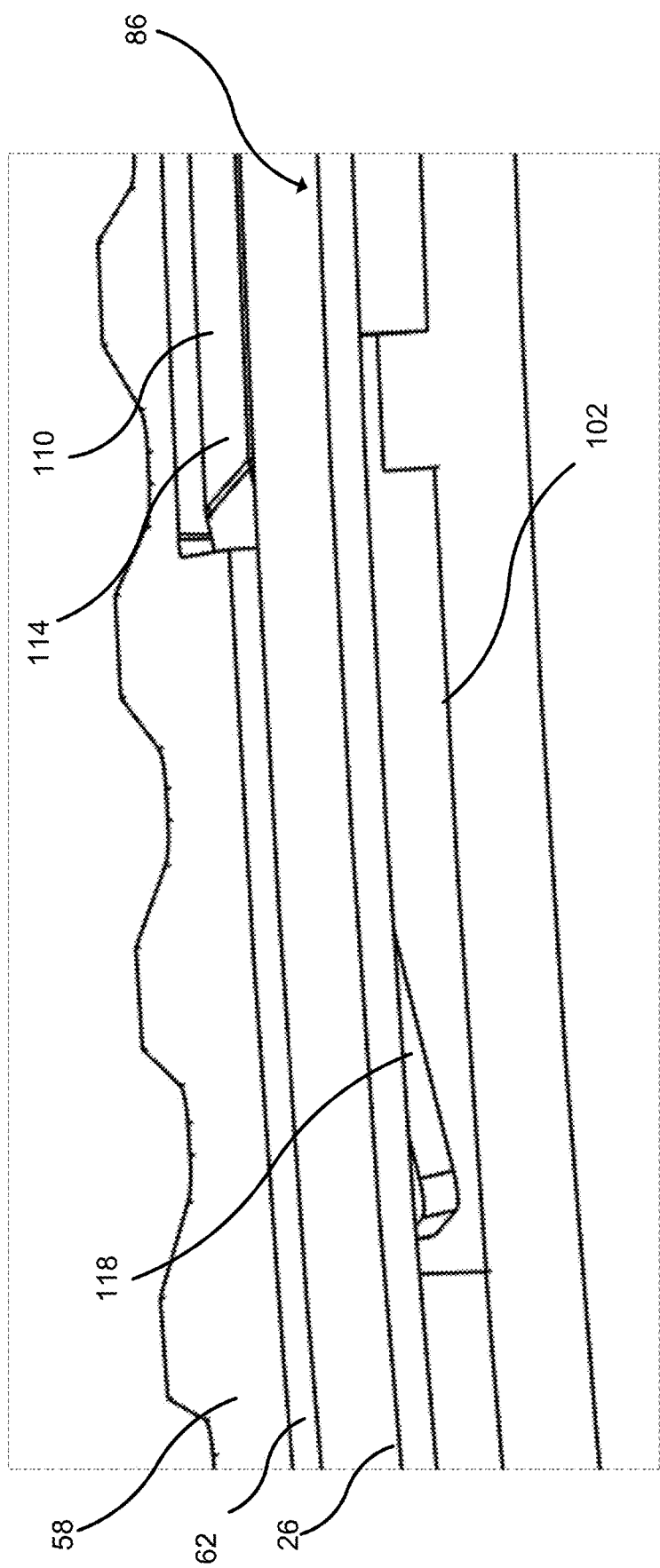
FIG. 11 is an enlarged view of the gobo carrier of FIG. 5 with the gobo retainer in the locked position of FIG. 9 and the gobo removed for clarity.
Figure 12:
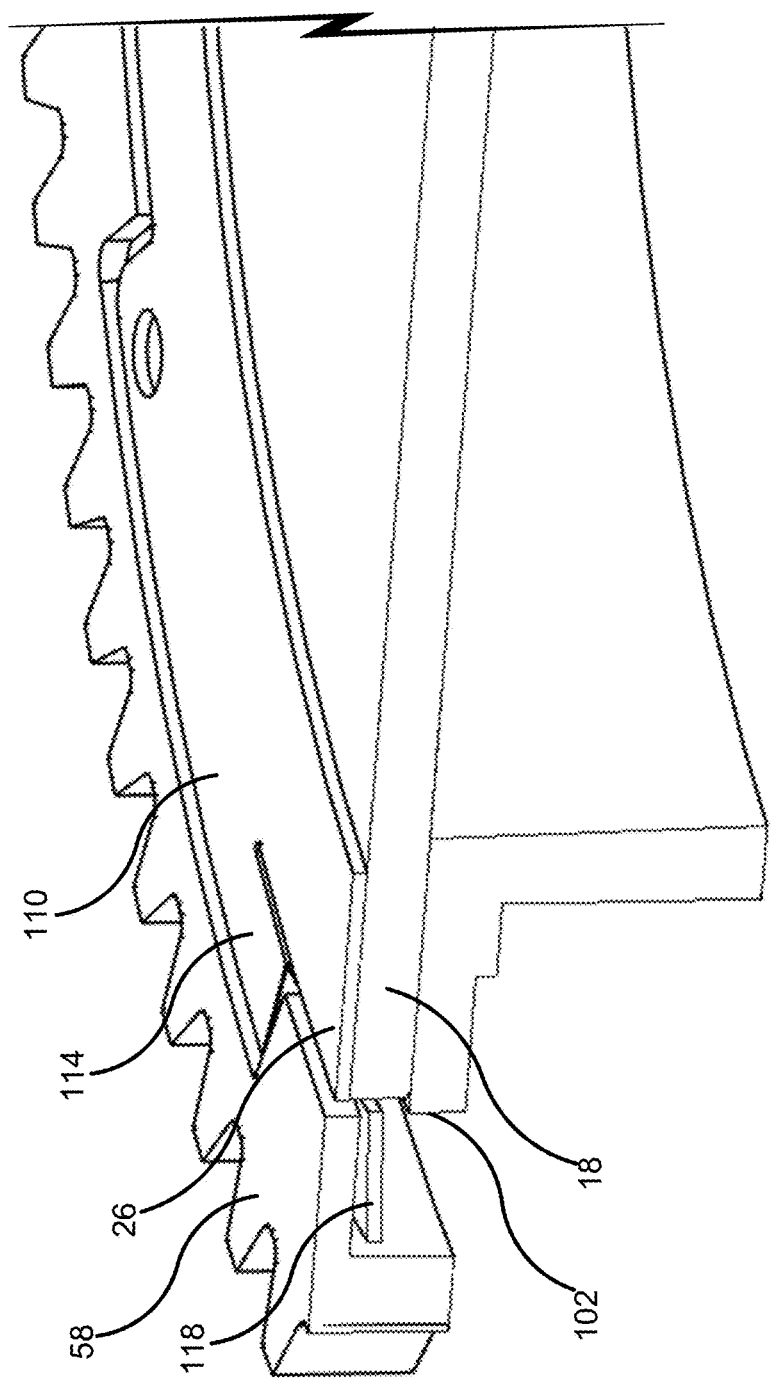
FIG. 12 is a cross-sectional enlarged view of the gobo carrier of FIG. 10.

With reference to FIGS. 11 and 12, the elastic force of the spring biased tab 118 pushes an end of the spring biased tab into the cut out 102. Each of the spring biased tabs 118 of the tabs 110 A-C interacts with the cut out 102 in this manner. The force imparted onto the spring biased tab 119 causes the gobo retainer 26 to be biased toward the ledge 82. In addition, unintentional rotation of the gobo retainer 26 is inhibited due to the interaction between the spring biased tab 118 and the ring gear 42. Because the spring biased tab 118 is biased downwardly into the cut out 102, this force also biases the parallel tab 114 downwardly such that the parallel tab 114 is no longer completely parallel with the circular ring 106. In this position, the parallel tab 114 is biased against the ramp portion 94 of the recessed portion 86. This interaction prevents the tabs 110 A-C from rotating along the recessed portion 86 without sufficient force. Since the gobo 18 is disposed between the gobo retainer 26 and the ledge 82, the gobo 18 is also biased toward the ledge 82. In this position, the gobo 18 and the retainer 26 are in a locked position (shown in FIG. 10).

Due to the third tab 110C being longer than the first and second tabs 110A and B, in the locked position of FIG. 10, the parallel tab 114 of the third tab 110C engages with the edge surface 126 of the straight portion 90. The interaction between the parallel tab 114 and the edge surface 126 prevents the tabs 110A-C from rotating. In this position, the hole 122 is positioned adjacent the interaction between the parallel tab 114 and the edge surface 126. To remove the gobo retainer 26 from the gobo carrier 22, a user pulls the hole 122 away from the recessed portion 86 (e.g., using a tool) such that the parallel tab 114 no longer engages with the edge surface 126 of the straight portion 90. Thereafter, the hole 122 is pulled in a clockwise direction such that the tabs 110A-C of the gobo retainer 26 exit from the channel 98, and slide along the ramp portion 94. In this position, the gobo retainer 26 is in the unlocked position and is free to be removed. Subsequently, the gobo 18 may be removed from the ledge.

Figure 13:
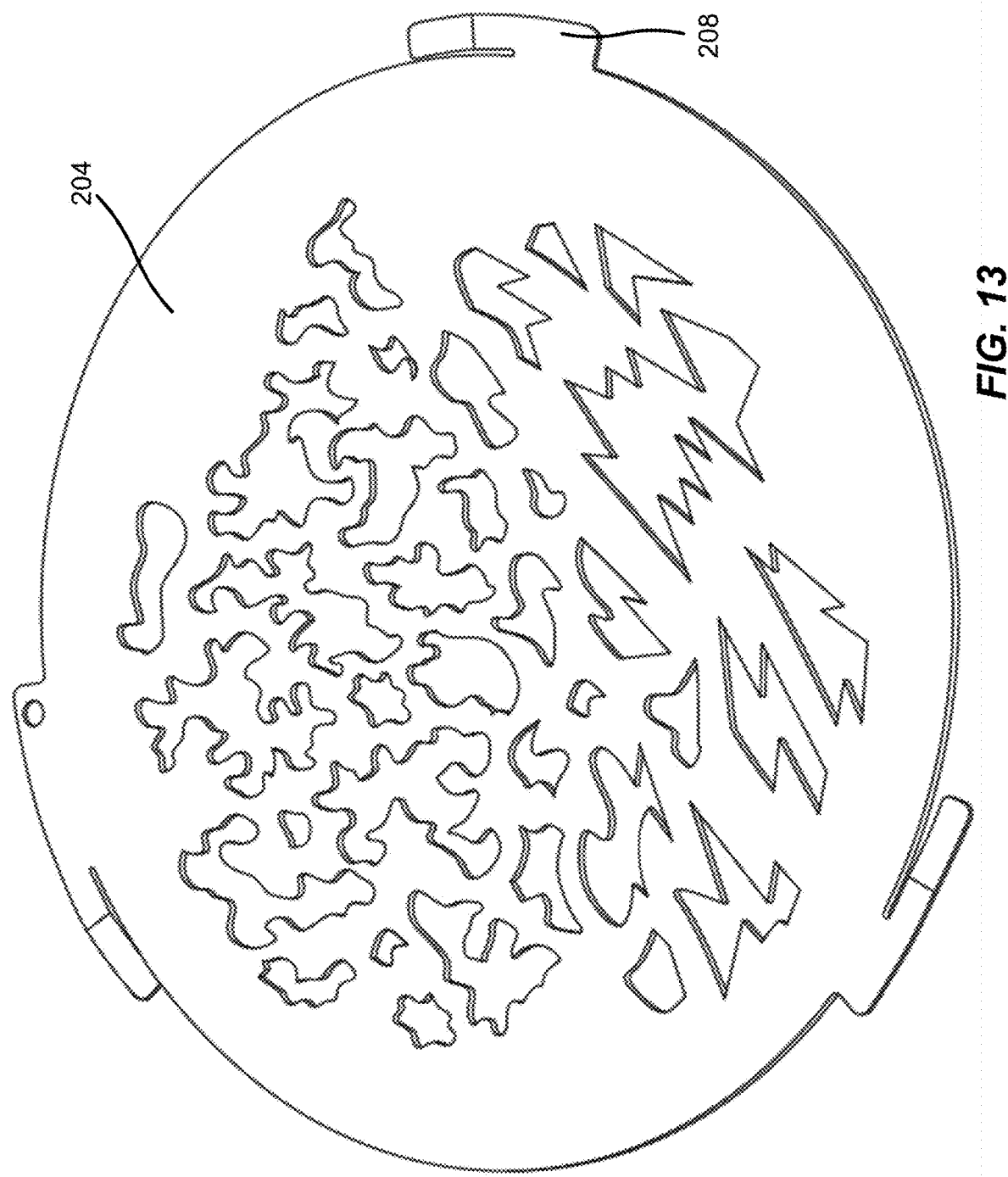
FIG. 13 is a perspective view of a gobo according to another embodiment of the invention.

FIG. 13 illustrates an additional embodiment of a gobo retainer 200. In this embodiment, a gobo 204 is integrally formed with the gobo retainer 200. In other words, the gobo 204 is not a separate component. The combination gobo 204 and gobo retainer 200 functions substantially the same as the gobo retainer 26 described above.

The rotating gobo system 10 is designed to be coupled to the lighting fixture. Once the rotating gobo system 10 is in the locked position and coupled to the lighting fixture, the rotatable shaft of the motor may rotate the central hub 34 of the gobo wheel 14. This motion adjusts which gobo 18 interacts with the emitted light of the lighting fixture. Once the desired gobo 18 has been selected, the motor may impart motion onto the sun gear 38. This rotational motion causes the gobo carriers 22 and, therefore, the gobos 18 to rotate about the central axis of each gobo carrier 22. Rotation of the gobos 18 may cause a pattern to be rotated onto the object which the emitted light is being cast thereon.

The invention has been described in detail and it should be understood that various changes, substitutions, and alterations can be made hereto without departing from the spirit and scope of the invention as described by the appended claims.

What is claimed is:

1. A gobo system for a light fixture, the gobo system comprising:
   a gobo;
   a gobo retainer removably coupled to the gobo and including a tab; and
   a gobo carrier coupled to the light fixture, the gobo carrier including a seat for supporting the gobo and a recess for receiving the tab of the gobo retainer;
   wherein the gobo retainer is rotatable relative to the gobo carrier between a locked position and an unlocked position.

2. The gobo system of claim 1, wherein in the locked position, the tab of the gobo retainer is disposed in the recess of the gobo carrier to couple the gobo to the gobo carrier, and wherein in the unlocked position, the tab of the gobo retainer is positioned such that the gobo retainer and the gobo are removable from the seat of the gobo carrier.

3. The gobo system of claim 1, wherein the recess is coupled to a channel, and wherein the tab is received in the channel when the gobo carrier is in the locked position.

4. The gobo system of claim 3, wherein the tab includes a spring portion, the spring portion is received in the channel when the gobo carrier is in the locked position.

5. The gobo system of claim 1, wherein the tab is a first tab and the gobo retainer includes a second tab and a third tab, the second and third tabs being receivable in corresponding recesses in the gobo carrier.

6. The gobo system of claim 5, wherein the first tab is circumferentially longer than the second tab and the third tab.

7. A light fixture comprising:
   a housing;
   a light source disposed in the housing and configured to create a light beam;
   a rotating gobo system coupled to the housing, the gobo system including,
      a gobo,
      a gobo retainer removably coupled to the gobo and including a tab, and
      a gobo carrier coupled to the light fixture, the gobo carrier including a seat for supporting the gobo and a recess for receiving the tab of the gobo retainer;
   wherein the gobo retainer is rotatable relative to the gobo carrier between a locked position and an unlocked position.

8. The light fixture of claim 7, wherein in the locked position, the tab of the gobo retainer is disposed in the recess of the gobo carrier to couple the gobo to the gobo carrier, and wherein in the unlocked position, the tab of the gobo retainer is positioned such that the gobo retainer and the gobo are removable from the seat of the gobo carrier.

9. The light fixture of claim 7, wherein the recess is coupled to a channel, and wherein the tab is received in the channel when the gobo carrier is in the locked position.

10. The light fixture of claim 9, wherein the tab includes a spring portion, the spring portion is receivable by the channel when the gobo carrier is in the locked position.

11. The light fixture of claim 7, wherein the gobo retainer includes a second tab and a third tab, the second and third tabs being receivable in corresponding recesses in the gobo carrier.

12. The light fixture of claim 11, wherein the tab is longer than the second tab and the third tab.

13. The gobo system of claim 1, wherein the gobo carrier includes a cylindrical portion defining the seat and a ring gear with an inner surface.

14. The gobo system of claim 13, wherein the seat is coupled to the inner surface of the ring gear.

15. The light fixture of claim 7, wherein the gobo carrier includes a cylindrical portion defining the seat and a ring gear with an inner surface.

16. The light fixture of claim 15, wherein the seat is coupled to the inner surface of the ring gear.

17. A gobo system for a light fixture, the gobo system comprising:
   a gobo disc configured to permit light from the light fixture to pass through;
   a carrier including a cylindrical portion with a ledge, the gobo disc is removably positioned within the carrier and supported on the ledge;
   a retainer including a ring that overlays the gobo disc on the ledge of the carrier;
   wherein the retainer is adapted to be rotated with respect to the carrier between a locked position in which the retainer and the gobo disc are locked to the carrier and an unlocked position in which the retainer and the gobo disc are removable from the carrier.

18. The gobo system of claim 17, wherein the retainer includes a tab extending from the ring, and wherein the carrier includes a recess configured to receive the tab.

19. The gobo system of claim 18, wherein the tab of the retainer includes a spring biased potion, and wherein the carrier includes a channel connected to the recess by a ramp, and wherein the spring biased portion is received within the channel when the retainer is in the locked position.

20. The gobo system of claim 17, further including a wheel having an aperture to receive the carrier, the carrier is rotatable with respect to the wheel.

* * * * *